(12) United States Patent
Henry

(10) Patent No.: US 8,249,372 B2
(45) Date of Patent: Aug. 21, 2012

(54) METHODS AND DEVICES FOR CODING AND DECODING MULTIDIMENSIONAL DIGITAL SIGNALS

(75) Inventor: Felix Henry, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 1180 days.

(21) Appl. No.: 12/048,688

(22) Filed: Mar. 14, 2008

(65) Prior Publication Data

US 2008/0226185 A1    Sep. 18, 2008

(30) Foreign Application Priority Data

Mar. 16, 2007  (FR) ..................... 07 53883
Mar. 29, 2007  (FR) ..................... 07 54129

(51) Int. Cl.
*G06K 9/36*    (2006.01)
*G06K 9/46*    (2006.01)
(52) U.S. Cl. ....................... 382/238; 382/260
(58) Field of Classification Search .......... 382/199, 382/238, 240, 260, 261, 263, 266
See application file for complete search history.

(56) References Cited

U.S. PATENT DOCUMENTS

| | | | | |
|---|---|---|---|---|
| 6,389,176 | B1 * | 5/2002 | Hsu et al. ................ | 382/254 |
| 2006/0290695 | A1 * | 12/2006 | Salomie .................. | 345/420 |
| 2008/0172434 | A1 | 7/2008 | Henry ..................... | 708/308 |
| 2010/0054613 | A1 | 3/2010 | Henry ..................... | 382/233 |

FOREIGN PATENT DOCUMENTS

| | | |
|---|---|---|
| EP | 0 871 331 A | 10/1998 |
| FR | 2 889 382 A | 2/2007 |
| WO | 2007/026264 | 3/2007 |
| WO | 2008/035223 | 3/2008 |

OTHER PUBLICATIONS

Huang W.C. et al.: "Predictive Subband Image Coding with Wavelet Transform", Signal Processing: Image Communication pp. 171-181, vol. 13, No. 3, Sep. 15, 1998.
Amjed S. Al-Fahoum et al.: "Combined Edge Crispiness and Statistical Differencing for Deblocking JPEG Compressed Images", IEEE Transactions on Image Processing, vol. 10, No. 9, pp. 1288-1298, Sep. 2001.
Richard C. et. al.: "Recursive Estimation of Local Characteristics of Edges in TV Pictures as Applied to ADPCM Coding", IEEE Transactions on Communications, pp. 718-728, vol. COM-32, No. 6, Jun. 1994.
Masatoshi Matsuo, et al.: "A Programmable Video Codec System for Low-Bit-Rate Communication", IEEE Trnasactions on Consumer Electronics, pp. 903-910, vol. 43, No. 3, Aug. 1997.

(Continued)

*Primary Examiner* — Phuoc Tran
(74) *Attorney, Agent, or Firm* — Fitzpatrick, Cella, Harper & Scinto

(57) ABSTRACT

In order to code a multidimensional digital picture signal by decomposition into frequency sub-bands, wherein the decomposition into frequency sub-bands uses a filtering according to a plurality of geometric orientations: a picture at a resolution lower than the resolution of the digital picture signal is obtained; the edges of the picture at the lower resolution are located; and orientation values are attributed to the data of the digital picture signal as a function of the result of the edge location step.

11 Claims, 8 Drawing Sheets

OTHER PUBLICATIONS

Tsujii, O., et al. "Lung Contour Detection in Chest Radiographs Using 1-D Convolution Neural Networks", Journal of Electronic Imaging, pp. 46-53, vol. 8, No. 1, Jan. 1999.

Reinhard, R. B., "Image Pre-processing: Local pre-processing", Lecture Notes of Course 55:148, Digital Image Processing at the University of Iowa, pp. 1-33, XP002467729,Chapter 4, Part III, Aug. 21, 2000, URL:http://www.icaen.uiowa.edu/{dip/LECTURE/Pre Processing3.html>.

Kimoto, T., et al.: "Runlength-Based Wavelet Coding with Adaptive Scanning for Low Bit Rate Environment", Image Processing, 1998. ICIP 983., IEEE Comput. Soceity., US pp. 326-330, Oct. 4, 1998.

Shen Sheng Mei., et al.: "Lossy to Lossless Video Compression by DCT/Non-DCT", Consumer Electronics, IEEE 1993 International Conference on Rosemont, IL, pp. 12-13, Jun. 8, 1993.

* cited by examiner

METHODS AND DEVICES FOR CODING AND DECODING MULTIDIMENSIONAL DIGITAL SIGNALS

The present invention relates to a method and device for coding digital signals with several spatial or spatio-temporal dimensions and to a method and device for decoding signals thus coded. Throughout the following, these signals are said to be multidimensional.

It belongs to the general field of the digital processing of signals and relates more precisely to the filtering and compression of multidimensional digital signals. By way of in no way limiting examples, the signals concerned can represent fixed pictures (that is to say signals with two spatial dimensions) or videos (that is to say signals with three dimensions: two spatial dimensions and one temporal dimension) or, more generally, multimedia data.

For example, a digital picture coming from a digital camera consists of a set of N×M elementary picture units or pixels, where N is the height of the picture and M its width. This picture is coded before being stored in memory. The initial data, that is to say the information representing the pixels of the picture, are organized in a bi-dimensional table accessible, for example, row by row.

A digital picture generally undergoes transformation prior to its coding. Likewise, during the decoding of a coded digital picture, the picture undergoes a reverse transformation. The transformation can consist of applying a filter to all or part of the digital picture.

A filter can be seen as a convolution product between the picture signal and a predetermined vector making it possible, for each pixel of the region to which it applies, to modify its value as a function of the values of the neighboring pixels, to which coefficients are allocated.

The coding technique described in patent document FR-A-2 889 382 makes it possible to filter the signal prior to compression, by orienting the filter along certain directions, for each pixel, with a view to reducing the dynamic range of the signal generated and thus increasing the compression of the signal.

In addition, International patent application with filing number PCT/IB07/003,756 describes a technique of calculating these orientations that consists of using the available data at a lower resolution in order to calculate the filtering orientations to be used at a higher resolution during the decomposition filtering of the picture, that is to say at the coder, and during the synthesis filtering of the picture, that is to say at the decoder. The resolution is the number of samples per spatial unit, that is to say, in the case of a picture, per unit surface area.

The coding technique in question includes a filtering of the multidimensional digital signal. The main aspects of this filtering, which are used by the present invention in a particular embodiment, are stated below. It is however not excluded that the invention uses another type of transformation, instead of such a filtering.

This filtering, which uses a decomposition of the signal into frequency sub-bands, aims to reduce the quantity of information present in the sub-bands, so as to improve the compression of the signal with a view to its storage or transmission.

Each filtered sample has an amplitude value and an orientation value. "Orientation" means here a direction in the picture (for example, row of pixels, or column of pixels, or diagonal of pixels).

A filtering in the geometric orientation that will have been determined as most appropriate is applied, so as to increase the performance of the filtering.

Such a filtering method makes it possible to take account of the local variations and in particular the local orientation of the flow of the digital signal whilst preserving the property of separability of filtering, that is to say the filtering can be applied independently to the various dimensions of the signal, for example, along the rows and along the columns or vice versa.

To facilitate the reverse filtering operation performed on decoding, it is possible to associate, at the time of coding, with each filtered sample, information representing the geometric orientation of the filter applied to this sample.

This filtering can for example be applied successively to each of the dimensions of the digital signal processed.

The filtering of samples can use a filtering scheme that is particularly advantageous for the present invention, referred to as a "lifting" scheme, with for example at least two filters, which can each be applied to different samples, which is economical in terms of memory space, given that the samples are replaced during their filtering.

As for the decoding of a multidimensional digital signal coded by such a technique, it consists mainly of obtaining a plurality of filtered samples and then applying a reverse filtering to filtered samples, this reverse filtering being carried out on a filtered sample in the geometric orientation of the filter that was used for the filtering of this sample during its coding according to the invention.

According to a first aspect, the aim of the present invention is to improve the speed of compression by calculating only the orientations that are strictly necessary to the correct compression of the signal, so as to accelerate the coding process without losing in terms of compression performance.

For this purpose, the present invention provides a method of coding a multidimensional digital picture signal by decomposition into frequency sub-bands, wherein this decomposition into frequency sub-bands uses a filtering according to a plurality of geometric orientations, this method comprising steps consisting of:

obtaining a picture with a resolution lower than the resolution of the digital picture signal;
  locating the edges of the picture at the lower resolution; and
  attributing to the data of the digital picture signal orientation values according to the result of the edge location step.

Thus the invention makes it possible to analyze the data available at a lower resolution in order to detect the presence of edges in the picture and to filter by oriented filtering only the parts of the picture that belong to an edge, the rest of the picture being filtered by a conventional filtering. This makes it possible to properly compress the signal while calculating the optimal orientation only on pixels that are actually needed. As this calculation step, which is fairly complex, is thus performed only on a relatively small proportion of the signal (typically 10 to 30%), the invention makes it possible to save on processing time.

In a particular embodiment, the orientation value attribution step consists of:

attributing a predetermined orientation value to data of the digital picture signal that do not belong to edges; and
  attributing to data of the digital picture signal that belong to edges an orientation value calculated as a function of data representing the picture at the lower resolution.

This way of proceeding avoids having to calculate orientations for the parts of the picture that do not belong to edges.

In a particular embodiment, the step of locating the edges of the picture at the lower resolution comprises steps consisting of:
  applying an edge detecting filtering to the picture at the lower resolution;
  determining a threshold; and
  deciding that all the pixels of the picture at the lower resolution obtained after application of the edge detecting filtering whose value is strictly less than the threshold do not belong to an edge and that all the other pixels belong to an edge.

This particular embodiment has low complexity of implementation.

In a particular embodiment, the step of applying an edge detector consists of applying a Sobel detector.

The Sobel detector is in fact particularly effective.

According to a particular feature, the aforementioned threshold depends on the content of the picture at the lower resolution obtained after application of the edge detecting filtering.

This makes it possible to adapt the quantity of edges to the content of the picture processed.

According to a particular feature, the predetermined orientation value attributed to the data of the digital picture signal that do not belong to an edge is horizontal.

This makes it possible to maintain a good compression quality on the part of the picture where the orientations are not optimized.

In a particular embodiment, the data representing the picture at the lower resolution as a function of which the orientation value to be attributed to the data of the digital picture signal that belong to edges is calculated result from a coded and then decoded version of the picture at the lower resolution.

This makes it possible to ensure that the step of calculating the orientations is performed on the basis of the same information at the coder and decoder.

In a particular embodiment, the aforementioned coded version results from the application of a coding method as succinctly described above.

This makes it possible to apply the invention to various resolutions of the picture and therefore to make these various resolutions benefit from all the advantages of the invention.

The multidimensional digital signal in question can represent a fixed picture.

The multidimensional digital signal in question can also represent a video.

For the same purpose as indicated above, the present invention also provides a device for coding a multidimensional digital picture signal by decomposition into frequency sub-bands, wherein this decomposition into frequency sub-bands uses a filtering according to a plurality of geometric orientations, this device being remarkable in that it comprises:
  a module for obtaining a picture at a resolution lower than the resolution of the digital picture signal;
  a module for locating the edges of the picture at the lower resolution; and
  a module for attributing to the data of the digital picture signal orientation values as a function of the output of the edge location module.

Still for the same purpose, the present invention correspondingly provides a method of decoding a multidimensional digital picture signal coded by decomposition into frequency sub-bands, wherein this decomposition into frequency sub-bands uses a filtering according to a plurality of geometric orientations, this method comprising steps consisting of:
  obtaining a decoded picture at a resolution lower than the resolution of the coded digital picture signal;
  locating the edges of the decoded picture at the lower resolution; and
  attributing to the data of the decoded picture at the lower resolution orientation values as a function of the result of the edge location step.

Still for the same purpose, the present invention also provides a device for decoding a multidimensional digital picture signal coded by decomposition into frequency sub-bands, wherein this decomposition into frequency sub-bands uses a filtering according to a plurality of geometric orientations, this device comprising:
  a module for obtaining a decoded picture at a resolution lower than the resolution of the coded digital picture signal;
  a module for locating the edges of the decoded picture at the lower resolution; and
  a module for attributing to the data of the decoded picture at the lower resolution orientation values as a function of the output of the edge location module.

Still for the same purpose, the present invention also relates to a telecommunications system comprising a plurality of terminal devices connected through a telecommunications network, comprising at least one terminal device equipped with a coding device and/or a decoding device as succinctly described above.

Still for the same purpose, the present invention also relates to an information storage means readable by a computer or a microprocessor storing instructions of a computer program, making it possible to implement a coding method and/or a decoding method as succinctly described above.

Still for the same purpose, the present invention also relates to a computer program product loadable into a programmable apparatus, comprising sequences of instructions for implementing a coding method and/or a decoding method as succinctly described above, when this program is loaded into and run by the programmable apparatus.

The particular features and the advantages of the coding device, of the decoding method and device, of the telecommunications system, of the information storage means and of the computer program product according to the first aspect of the invention being similar to those of the coding method according to that first aspect, they are not repeated here.

According to a second aspect, the aim of the present invention is to improve the quality of the calculated orientations, by means of ideal orientations calculated in advance. The ideal orientations are those that would lead to the best possible compression.

For this purpose, the present invention provides a method of coding a multidimensional digital picture signal by decomposition into frequency sub-bands, wherein this decomposition into frequency sub-bands uses a filtering according to a plurality of geometric orientations, this method comprising steps consisting of, for a plurality of samples of the picture signal:
  generating a first orientation prediction according to a predetermined technique;
  determining an ideal filtering orientation by simulating the filtering of the picture signal as a function of a predetermined optimization criterion;
  modifying the first orientation prediction using the ideal orientation, so as to obtain a final orientation; and
  filtering the picture signal using, during the filtering according to a plurality of orientations, the aforementioned final orientation.

Thus, the invention makes it possible to increase the compression performance by improving the quality of the orientations used for filtering.

According to a particular feature, during the modification step, the linear prediction of the difference between the first prediction and the ideal orientation is used.

The use of the linear predication is in fact particularly simple to implement.

As a variant, during the modification step, it is possible to use a state calculation and attribute to each sample in the plurality of samples an orientation as a function of the state of this sample.

This constitutes in fact a particularly efficient technique in terms of compression.

According to a particular feature, during the step of generating a first orientation prediction, the edges of the decoded low-frequency sub-band of resolution lower than the resolution of a selected current sub-band are analyzed.

According to a particular feature, the aforementioned optimization criterion consists of the minimization of the amplitude of the output samples of the filtering.

This makes it possible to reduce the rate in a simple fashion.

As a variant, the optimization criterion consists of the minimization of the coding rate for the output samples of the filtering.

According to yet another variant, the optimization criterion consists of the minimization of the coding cost for the output samples of the filtering, the coding cost of a sample resulting from a linear combination of the rate associated with the coding of this sample and the distortion caused by the coding of this sample.

The above two variants make it possible to optimize the compression.

The multidimensional digital signal in question can represent a fixed picture.

The multidimensional digital signal in question can also represent a video.

For the same purpose as that indicated above, the present invention also provides a device for coding a multidimensional digital picture signal by decomposition into frequency sub-bands, wherein this decomposition into frequency sub-bands uses a filtering according to a plurality of geometric orientations, this device comprising modules adapted, for a plurality of samples of the picture signal, to:
  generate a first orientation prediction according to a predetermined technique;
  determine an ideal filtering orientation by simulating the filtering of the picture signal as a function of a predetermined optimization criterion;
  modify the first orientation prediction using the ideal orientation, so as to obtain a final orientation; and
  filter the picture signal using, during the filtering according to a plurality of orientations, the aforementioned final orientation.

Still for the same purpose, the present invention correspondingly provides a method of decoding a multidimensional digital picture signal coded by decomposition into frequency sub-bands, wherein this decomposition into frequency sub-bands uses a filtering according to a plurality of geometric orientations, this method comprising steps consisting of, for a plurality of samples of the coded picture signal:
  generating a first orientation prediction;
  receiving additional information contained in the coded picture signal;
  modifying the first orientation prediction using the additional information, so as to obtain a final orientation; and
  filtering the coded picture signal using, during the filtering according to a plurality of orientations, the aforementioned final orientation.

Still for the same purpose, the present invention also provides a device for decoding a multidimensional digital picture signal coded by decomposition into frequency sub-bands, wherein this decomposition into frequency sub-bands uses a filtering according to a plurality of geometric orientations, this device comprising modules adapted, for a plurality of samples of the coded picture signal, to:
  generate a first orientation prediction;
  receive additional information contained in the coded picture signal;
  modify the first orientation prediction using the additional information, so as to obtain a final orientation; and
  filter the coded picture signal using, during the filtering according to a plurality of orientations, the aforementioned final orientation.

Still for the same purpose, the present invention also relates to a telecommunications system comprising a plurality of terminal devices connected through a telecommunications network, comprising at least one terminal device equipped with a coding device and/or a decoding device as succinctly described above.

Still for the same purpose, the present invention also relates to an information storage means readable by a computer or a microprocessor storing instructions of a computer program, making it possible to implement a coding method and/or a decoding method as succinctly described above.

Still for the same purpose, the present invention also relates to a computer program product loadable into a programmable apparatus, comprising sequences of instructions for implementing a coding method and/or a decoding method as succinctly described above, when this program is loaded into and run by the programmable apparatus.

The particular features and the advantages of the coding device, of the decoding method and device, of the telecommunications system, of the information storage means and of the computer program product according to the second aspect of the invention being similar to those of the coding method according to that second aspect, they are not repeated here.

Other aspects and advantages of the invention will emerge from a reading of the following detailed description of particular embodiments, given by way of non-limiting examples. The description refers to the accompanying drawings, in which.

Figure 1:
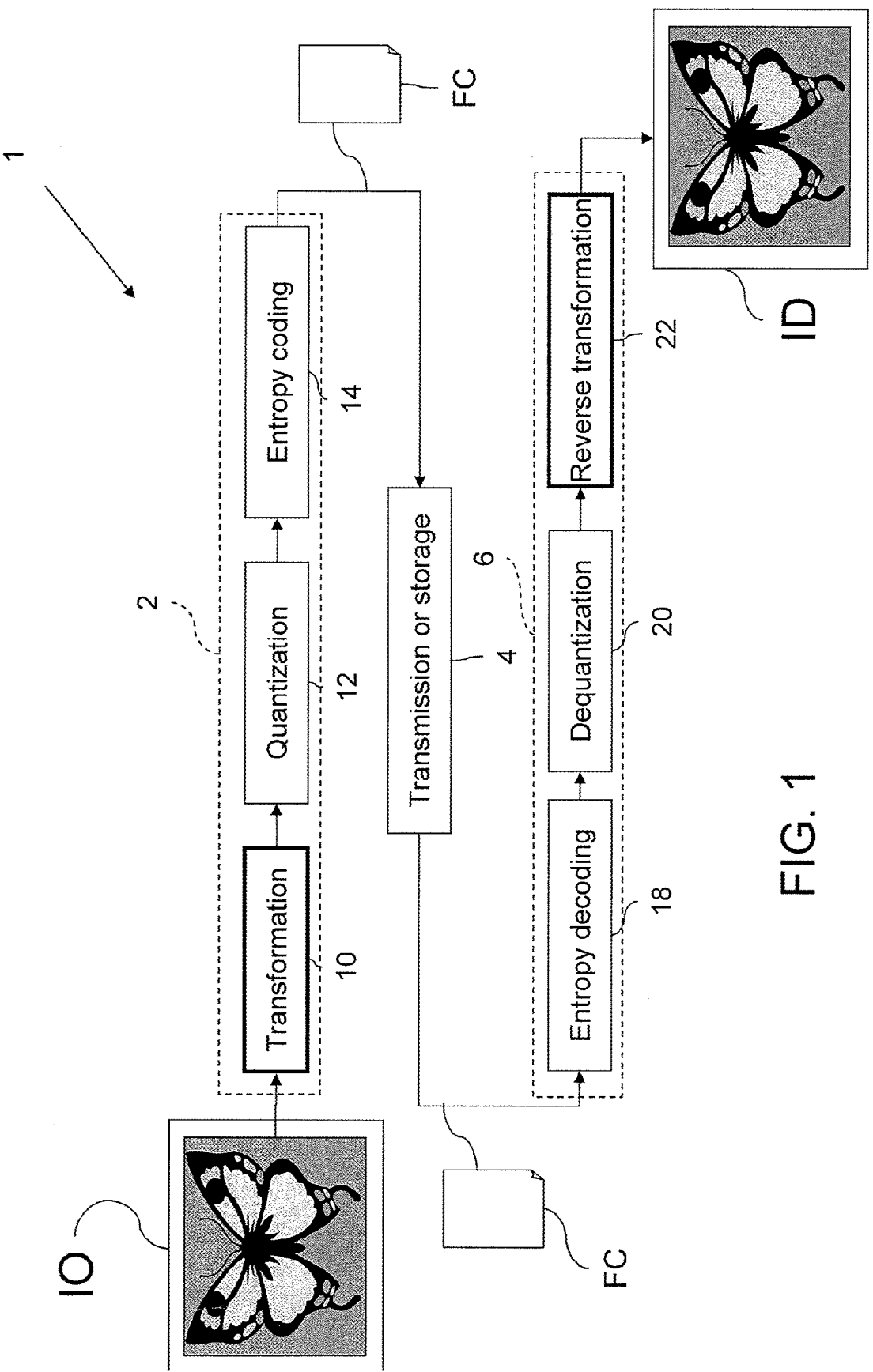
FIG. 1 shows in a simplified manner a digital picture processing system able to implement a coding method and/or a decoding method according to the present invention.

The block diagram in FIG. 1 illustrates a system for processing digital pictures, in particular by coding and decoding according to the invention, designated by the general reference denoted 1.

The system comprises a coding device 2, a transmission or storage unit 4 and a decoding device 6.

The invention finds a particularly advantageous application in a telecommunications system comprising a plurality of terminal devices connected through a telecommunications network. The coding method according to the invention can be implemented in terminal devices of the system, so as to allow a transmission of files through the telecommunication network and thus reduce the traffic and transmission times.

Another particularly advantageous application consists of implementing the coding method according to the invention in a device for storing multimedia entities, so as to be able to store a large quantity of data in a storage unit.

As shown by FIG. 1, the coding device 2 according to the invention receives as an input an original picture 10. The picture 10 is processed by the coding device 2, which outputs a coded file, designated by the reference sign FC, containing compressed picture data.

The processing carried out in the coding device 2 consists of performing operations of transformation, quantization and entropy coding, respectively in the units 10, 12 and 14.

The transformation operation performed in the unit 10 is that which implements the invention, while the quantization and entropy coding operations respectively performed in the units 12 and 14 use conventional means.

The coded file FC is supplied to the transmission or storage unit 4, in order for example to be transmitted over a network or stored in a storage unit.

The decoding device 6 receives as an input the coded file FC coming from the transmission or storage unit 4 and outputs a decoded (or decompressed) picture ID, which is substantially identical to the original picture 10.

During decoding, the coded picture is successively subjected to operations of entropy decoding, dequantization and reverse transformation, respectively in the units 18, 20 and 22.

The reverse transformation operation performed in the unit 22 is that which implements the invention, while the entropy decoding and dequantization steps respectively performed in the units 18 and 20 use conventional means.

Generally the initial data corresponding to the original picture 10 are organized in a bi-dimensional table that is accessible row by row.

The particular embodiment described below presents the coding and decoding of a fixed digital picture, that is to say of a bi-dimensional signal. The principle is however identical for a signal having a higher number of dimensions, for example for a video, which, as mentioned in the introduction, is composed of three dimensions.

A description is now given of the coding, in accordance with the method of the invention, of a digital picture, this coding comprising in particular a filtering phase consisting of decomposing the digital picture signal into frequency sub-bands.

In the particular embodiment of the invention described in detail below, this type of filtering in sub-bands is used for compressing the digital picture. Such a filtering can for example be used in the JPEG standard or in the JPEG2000 standard, during an operation also referred to as wavelet decomposition.

For more details on the JPEG2000 standard, reference can usefully be made to the following Internet address: www.jpeg.org.

However, the present invention differs from the filtering as used in JPEG2000 since the filters used can be oriented, as described in patent document FR-A-2 889 382.

Figure 4:
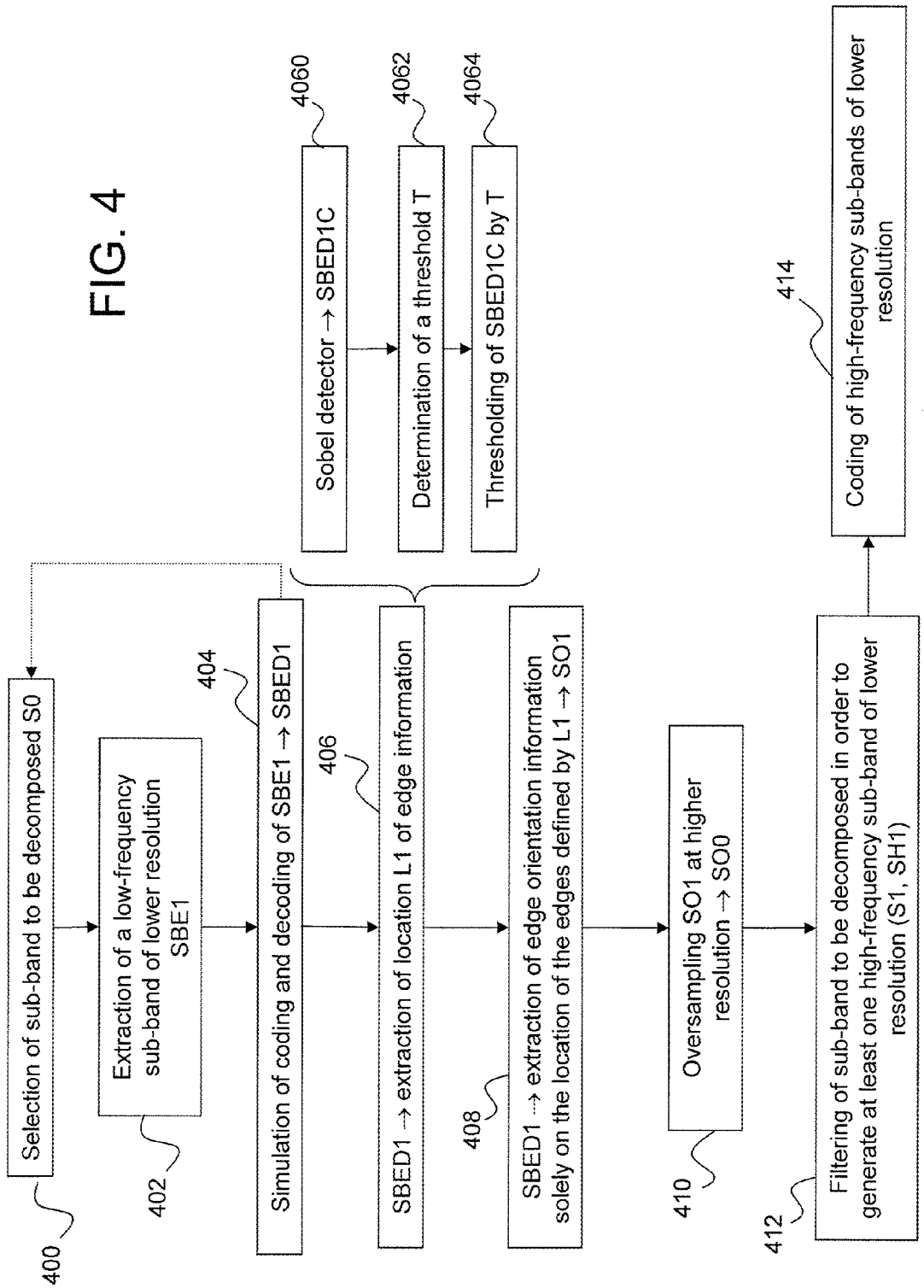
FIG. 4 is a flow diagram illustrating the main steps of a coding method according to the first aspect of the present invention, in a particular embodiment.

The flow diagram in FIG. 4 illustrates steps of a coding method according to the first aspect of the present invention, in a particular embodiment.

A filtering in sub-bands consists of applying a filtering to an original signal in order to generate one or more sub-bands corresponding to different frequencies. The set of these sub-bands corresponds to a given resolution.

It is then usual to select one or more of these sub-bands in order to decompose them once again into sub-bands, which will correspond in their turn to the following resolution.

This process can be repeated a predetermined number of times, according to the desired resolution.

As shown by FIG. 4, the algorithm begins at step 400, during which the initial picture to be decomposed is selected. This picture will be considered to be a frequency sub-band to be filtered.

As a variant, the sub-band to be decomposed can be a sub-band obtained during a previous filtering.

The sub-band selected is denoted S0 and its resolution R0.

The following step 402 consists of extracting a sub-band with a resolution R1 lower than R0, which corresponds to a low-frequency filtering of S0.

In a particular embodiment, this consists of subsampling the sub-band of resolution R0 by a factor of 2 in each dimension. Let $S0(x,y)$ be the sample situated at the coordinates (x,y) in the sub-band S0 of resolution R0. The low-frequency sub-band extracted SBE1, of resolution R1, is given by $SBE1(x,y)=S0(2\times x, 2\times y)$.

As a variant, this extraction can use a more complex method than simple subsampling. For example, it may be a case of a subsampling associated with a low-pass filtering, similar to the low-pass filtering used in JPEG2000.

The following step 404 is optional. It is not necessary in particular in the case of a lossless compression of the signal. On the other hand, it is recommended if a lossy coding of the signal is carried out. It consists of simulating a coding and decoding of the sub-band SBE1, so as to generate the sub-band SBED1.

The sub-band SBED1 is similar to the sub-band SBE1, except that it includes any errors due to the coding and decoding operations.

It should be noted that this coding/decoding can itself implement the technique of the present invention (division into frequency sub-bands, quantization, entropy coding as described previously and below). The invention is in this case applied recursively.

Step 402, followed or not by step 404, is followed by a step 406 of extracting the location of the edges.

The sub-band SBED1 (or SBE1 if step 404 has not been applied) is used to determine the location of the edges of the sub-band S0. In a particular embodiment, step 406 comprises three substeps: a substep 4060 of applying a Sobel detector, a substep 4062 of determining a threshold, and a thresholding substep 4064, described below.

During the substep 4060, an edge detecting filtering is applied to the picture. It is possible for example to apply a Sobel detector, a widespread filtering technique known to persons skilled in the art, which consists of applying two bi-dimensional filterings to the picture. For more details about the Sobel detector, reference can usefully be made to the following Internet site: http://homepages.inf.ed.ac.uk/rbf/HIPR2/sobel.htm.

The mean intensity of the output of these two filterings is proportional to the presence of an edge at the filtering place and the arctangent of the ratio of the outputs of these two filterings gives the local orientation of the edge. During substep 4060, only the intensity picture is used, but not the arctangent picture, which will be used during a subsequent step. A picture SBED1C is obtained.

As a variant, it is possible to replace the Sobel detector with a Robert Cross edge detecting filtering.

Substep 4062 consists of determining a threshold T. This threshold can for example be a predetermined value, for example 100. This threshold can also be a function of the content of the picture SBED1C: for example, the threshold can be derived from the energy present in the picture SBED1C. The threshold can also be derived from a set of test pictures.

Substep 4064 consists of thresholding the picture SBED1C by the threshold T. All the pixels of SBED1C whose value is strictly less than the threshold T will be considered not to belong to an edge and all the others will be considered to belong to an edge. The picture obtained after application of the threshold T is called L1.

As a variant, it is possible to determine the location of the edges in a different fashion, as described in the article by O. Tsujii, M. T. Freedman and S. K. Mun entitled "*Lung contour detection in chest radiographs using 1-D convolution neural networks*" published in Journal of Electronic Imaging, January 1999, vol. 8, No. 1, pages 46 to 53.

In this variant, two neural networks trained in the detection of edges in a mono-dimensional signal, using a learning sequence consisting of reference pictures in which the location of the edges is already known, are applied respectively along horizontal and vertical orientations of the picture. The resulting two black and white pictures, where the white represents the edge detection and the black the absence of edge, are merged by an OR binary operator. The resulting picture contains the edge location information.

Step 408, which follows the step 406 of extracting the location of the edges, consists of using the sub-band SBED1 to predict the orientation to be used for generating the high-frequency sub-bands with the same resolution as SBE1. Various approaches are possible.

In a particular embodiment, the orientation of the edges is extracted from the sub-band SBED1. However, this orientation is extracted from a calculation only for the pixels that belong to an edge. For the other pixels, it is predetermined. Thus, for each pixel of SBED1:

if this pixel belongs to an edge within the meaning of the previous step (this information being given by the picture L1), the Sobel filtering is applied, which, as has been seen, consists of two filterings, the arctangent of the ratio of the outputs of the two filterings giving the local orientation of the edge, and the orientation value given by this filtering is attributed to this pixel; and if this pixel does not belong to an edge, a predetermined value is allocated to it, resulting for example from a filtering according to the horizontal orientation.

The picture thus produced is called SO1.

During the following step 410, the picture SO1 is oversampled in order to produce the picture predicting the orientations SO0. The oversampling consists conventionally of increasing the number of samples per unit length by a factor of 2 in each dimension. The samples added are constructed by duplicating the samples of SO1, or by filtering.

Then, during a step 412, the original sub-band is filtered by oriented filtering, according to a technique of the type described in patent document FR-A-2 889 382, so as to generate the high-frequency sub-bands of resolution R1.

Figure 2:
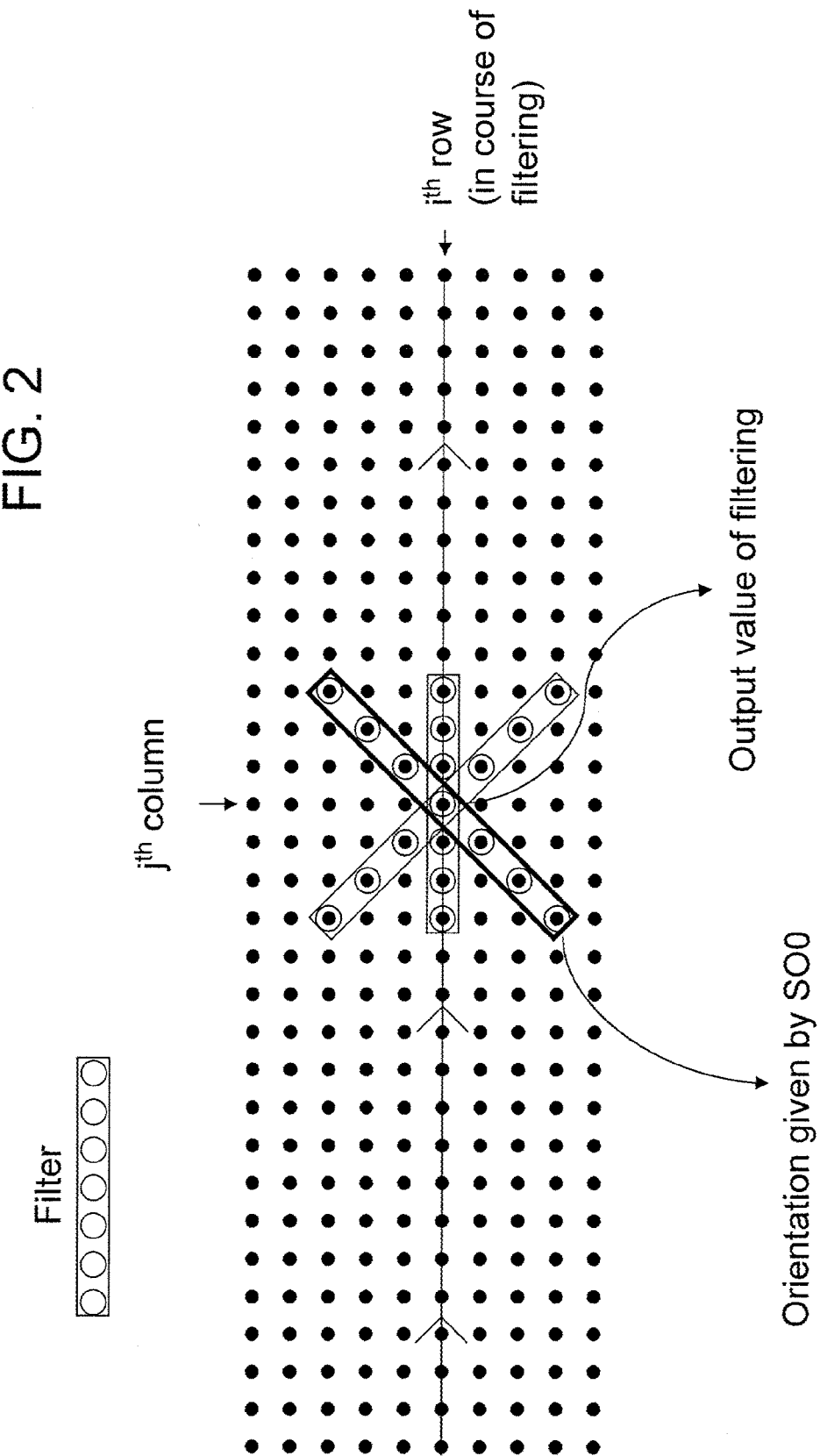
FIG. 2 illustrates a non-limiting example of a simulation of filtering according to three possible geometric orientations.

FIG. 2 shows such a filtering. The principle thereof is stated below.

The first step is to determine a filter to be applied to the current sample, among a plurality of possible filters.

In the particular embodiment described here, two filters can be used.

A first filter, called a low-pass filter, has the role of extracting the low frequencies of the signal.

For example, in the case of a mono-dimensional signal to be coded, that is to say formed by a series of samples:

$$\{\ldots, x_{i-3}, x_{i-2}, x_{i-1}, x_i, x_{i+1}, x_{i+2}, x_{i+3}, \ldots\},$$

if a low-pass filter is used having the coefficients:

$$[-1/16, 0, 5/16, 1, 5/16, 0, -1/16],$$

the result of the filtering is shown by the following filtered sample values:

$$y_i = -x_{i-3}/16 + 5x_{i-1}/16 + x_i + 5x_{i+1}/16 - x_{i+3}/16.$$

A second filter, called a high-pass filter, extracts the high frequencies of the signal.

For example, the result of the filtering of the mono-dimensional signal:

$$\{\ldots, x_{i-3}, x_{i-2}, x_{i-1}, x_i, x_{i+1}, x_{i+2}, x_{i+3},\}$$

by the high-pass filter whose coefficients are:

$$[1/16, 0, -9/16, 1, -9/16, 0, 1/16]$$

is represented by:

$$y_i = x_{i-3}/16 - 9x_{i-1}/16 + x_i - 9x_{i+1}/16 + x_{i+3}/16.$$

These high-pass and low-pass filters are used in the decomposition according to the lifting scheme, which is particularly adapted to the present invention. For more details on the lifting scheme, reference can usefully be made to the following Internet site: http://www.bearcave.com/misl/misl_tech/wavelets/lifting/predict.html.

In the particular embodiment described here, during the filtering of a row, if the row being filtered is filtered for the first time, the filter applied is the high-pass filter. In the contrary case, the filter to be applied is the low-pass filter.

FIG. 2 shows schematically, on the one hand, the current filter to be applied to the digital picture and, on the other hand, the application of this filter to the current sample. In the example shown in FIG. 2, the current sample is sample number j in the current row number i, in other words the one corresponding to the $i^{th}$ row and to the $j^{th}$ column of pixels of the picture.

The example in FIG. 2 corresponds to a particular embodiment in which three geometric orientations are possible.

The coefficient of the current sample is denoted xi,j.

Thus, the three geometric orientations according to which the mono-dimensional filtering is applied are defined as follows:

$$\{x_{i-3,j-3}, x_{i-2,j-2}, x_{i-1,j-1}, x_{i,j}, x_{i+1,j+1}, x_{i+2,j+2}, x_{i+3,j+3}\}$$
$$\{x_{i,j-3}, x_{i,j-2}, x_{i,j-1}, x_{i,j}, x_{i,j+1}, x_{i,j+2}, x_{i,j+3}\}$$
$$\{x_{i+3,j-3}, x_{i+2,j-2}, x_{i+1,j-1}, x_{i,j}, x_{i-1,j+1}, x_{i-2,j+2}, x_{i-3,j+3}\}$$

which corresponds to respective orientations of 45°, 0° and −45°.

One of these three orientations will serve to actually filter the signal. In a particular embodiment, there are eight possible orientations corresponding to angles uniformly distributed between −90° and 90°.

The orientation used on each sample of S0 is given by the prediction picture of the samples SO0. By filtering the sample of S0 situated at the coordinates (x,y), use will be made of the predetermined orientation, among the eight possible predetermined orientations of the particular embodiment mentioned above, that is closest to SO0(x,y).

In practice, during the filtering of a digital picture that is a signal of dimension 2, this filtering is iterated three times in order to generate the three sub-bands SH1 said to be of high frequency corresponding to:

- a high-frequency filtering on the horizontal axis and a low-frequency filtering on the vertical axis,
- a low-frequency filtering on the horizontal axis and a high-frequency filtering on the vertical axis,
- a high-frequency filtering on the horizontal axis and a high-frequency filtering on the vertical axis.

The sub-band corresponding to a low-frequency filtering on each dimension is the sub-band SBE1.

In the case of the filtering of the original sub-band S0, three new high-frequency sub-bands are therefore produced, as in the conventional wavelet transform.

As shown by FIG. 4, step 414, which follows step 412 of obtaining the three high-frequency sub-bands of lower resolution, consists of coding these three sub-bands. This coding is performed in a conventional fashion, for example by scalar quantization or vector quantization and then application of an entropy coding such as Huffman coding or arithmetic coding.

It is also possible to code not only the three high-frequency sub-bands but also the low-frequency sub-band SBE1, in particular in the case where it is not decomposed into sub-bands of lower resolution.

Figure 5:
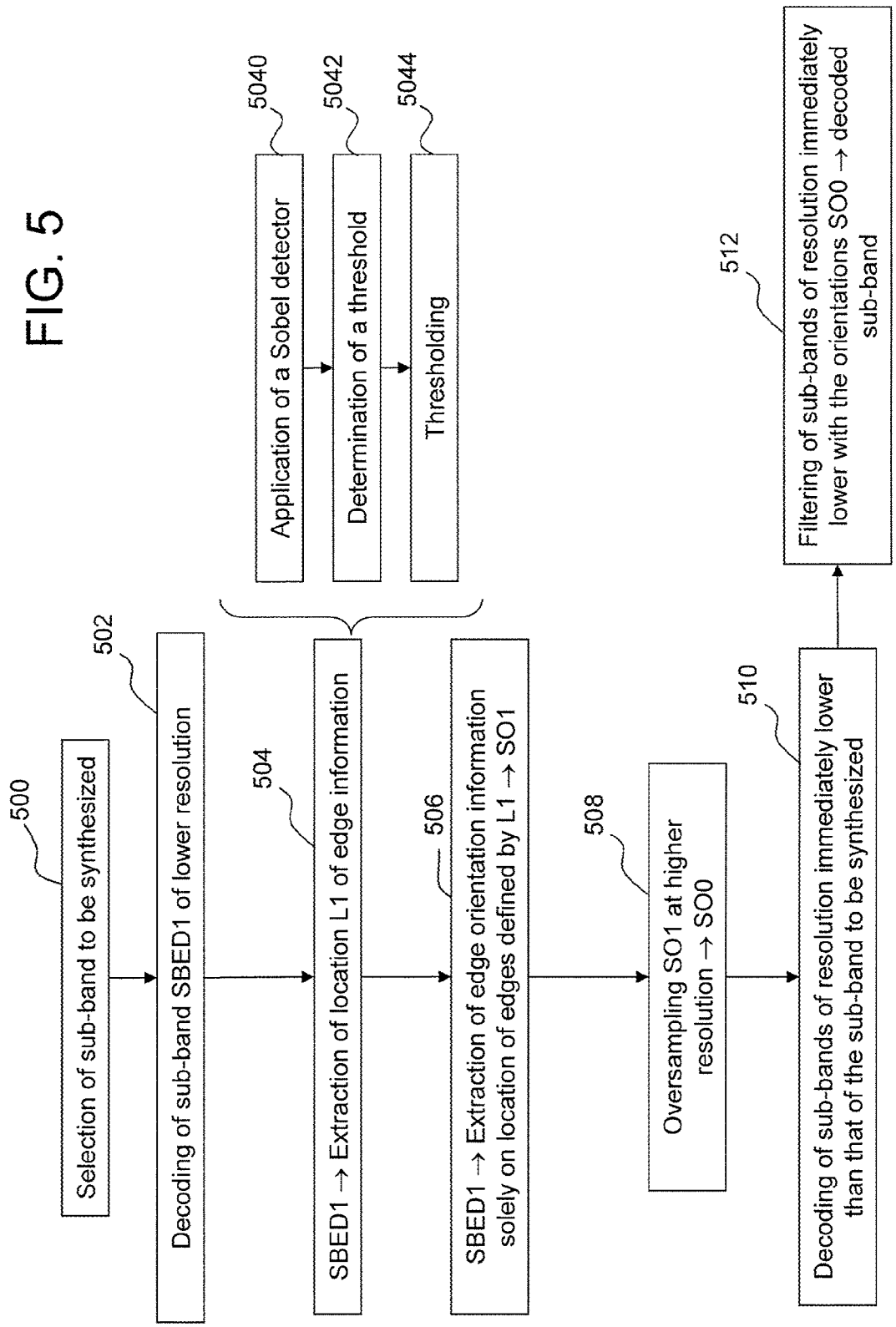
FIG. 5 is a flow diagram illustrating the main steps of a decoding method according to the first aspect of the present invention, in a particular embodiment.

The algorithm for decoding a low-frequency sub-band S0D, that is to say the decoded version of the sub-band S0 of the coding, is described below with reference to FIG. 5.

This low-frequency sub-band can be either the picture to be decoded or a low-frequency sub-band which will subsequently be combined with high-frequency sub-bands in order to generate a low-frequency sub-band of higher resolution.

During a step 500, the sub-band to be synthesized is first selected and then, during a step 502, the low-frequency sub-band of resolution immediately lower than that of S0 is decoded. This is SBED1, this name being identical to that used during coding, since it is exactly the same sub-band.

Then the following three steps 504 of extracting the location of the edges (including the substeps 5040 of applying a Sobel detector, 5042 of determining a threshold and 5044 of thresholding), 506 of extracting the filtering orientations and 508 of oversampling are strictly similar to those applied during coding. Likewise, if, during coding, the location of the edges was determined by means of the variant embodiment using neural networks as described above, the same method would be used during decoding.

This is moreover what guarantees that the orientations thus generated are exactly the same, which is necessary for the reversibility of the process.

Next, during a step 510, the three high-frequency sub-bands SH1 with the same resolution as SBED1 are decoded. The decoding of each of these sub-bands is effected by conventional methods such as Huffman entropy or arithmetic decoding and scalar or vector dequantization.

Then during step 512, a reverse filtering similar to the reverse filtering described in patent document FR-A-2 889 382 is carried out. It is a case of applying a filter with a certain orientation to the combined pictures SBED1 and SH1. The orientations are supplied by steps similar to those used during coding and described above.

This filtering results in producing the sub-band S0D, which is the decoded picture.

Figure 6:
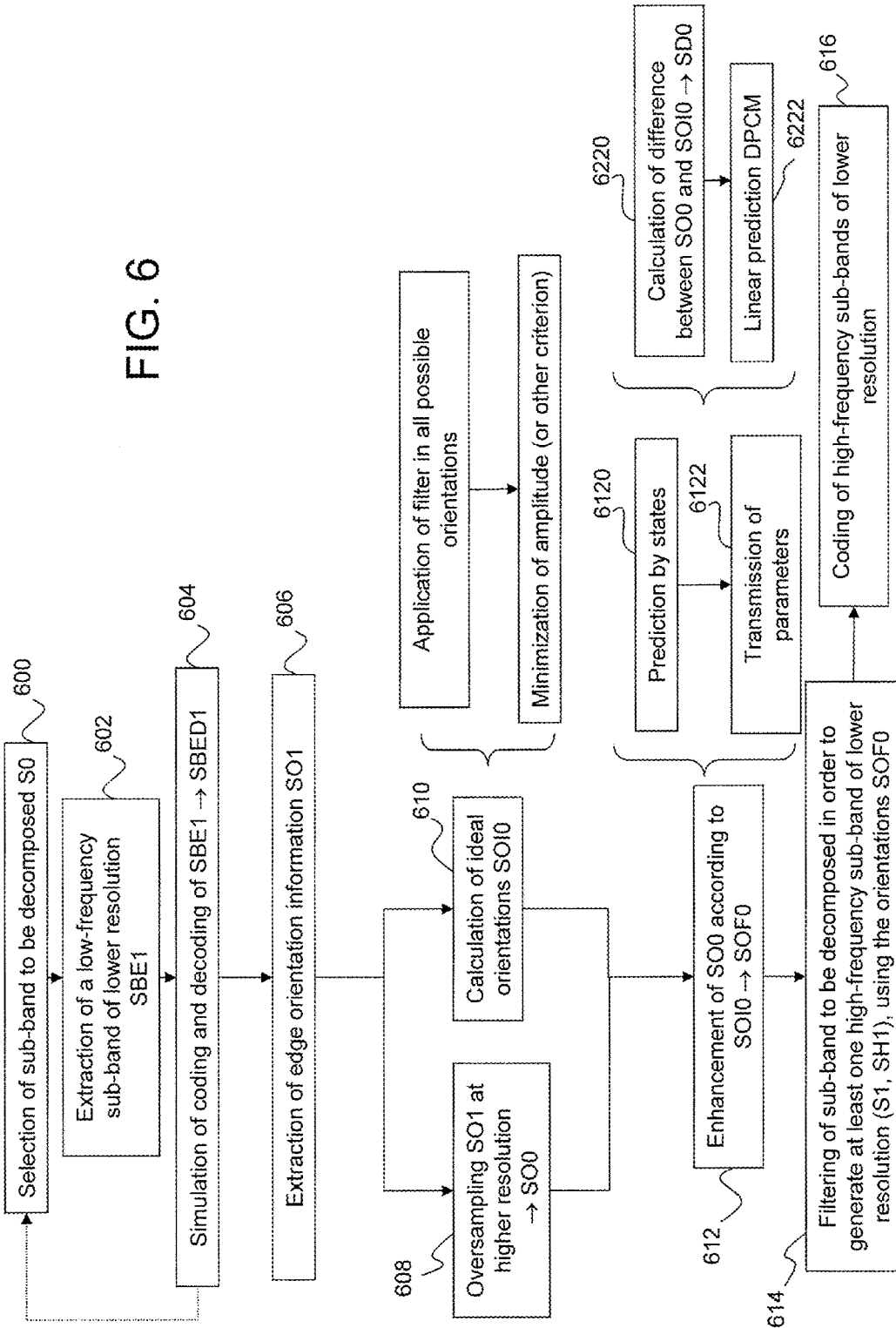
FIG. 6 is a flow diagram illustrating the main steps of a coding method according to the second aspect of the present invention, in a particular embodiment.

The flow diagram in FIG. 6 illustrates steps of a coding method according to the second aspect of the present invention, in a particular embodiment.

As shown by FIG. 6, the algorithm begins at step 600, during which the initial picture to be decomposed is selected. This picture will be considered to be a frequency sub-band to be filtered.

As a variant, the sub-band to be decomposed can be a sub-band obtained during a previous filtering.

The sub-band selected is denoted S0 and its resolution R0.

The following step 602 consists of extracting a sub-band with a resolution R1 lower than R0, which corresponds to a low-frequency filtering of S0.

In a particular embodiment, this consists of subsampling the sub-band of resolution R0 by a factor of 2 in each dimension. Let $S0(x,y)$ be the sample situated at the coordinates (x,y) in the sub-band S0 of resolution R0. The low-frequency sub-band extracted SBE1, of resolution R1, is given by $SBE1(x,y)=S0(2\times x, 2\times y)$.

As a variant, this extraction can use a more complex method than simple subsampling. For example, it may be a case of a subsampling associated with a low-pass filtering, similar to the low-pass filtering used in JPEG2000.

The following step 604 is optional. It is not necessary in particular in the case of a lossless compression of the signal. On the other hand, it is recommended if a lossy coding of the signal is carried out. It consists of simulating a coding and decoding of the sub-band SBE1, so as to generate the sub-band SBED1.

The sub-band SBED1 is similar to the sub-band SBE1, except that it includes any errors due to the coding and decoding operations.

It should be noted that this coding/decoding can itself implement the technique of the present invention (division into frequency sub-bands, quantization, entropy coding as described previously and below). The invention is in this case applied recursively.

Step 602, followed or not by step 604, is followed by a step 606 of extracting the orientation prediction.

As from step 606, the coding method can be applied to all or some of the samples of the picture signal.

The sub-band SBED1 (or SBE1 if step 604 has not been applied) is used to generate a first prediction of the orientation to be used for generating the high-frequency sub-bands with the same resolution as SBED1. Various approaches are possible.

In a particular embodiment, this first orientation prediction is extracted by analyzing the edges of the sub-band SBED1. Thus, for each pixel of SBED1, an edge detector for example of the Sobel filtering type is applied.

The orientation value given by this filtering is therefore attributed to each pixel of SBED1.

In a particular embodiment, the orientations are furthermore rounded to the closest orientation among the following eight orientations: {0°; 22.5°; 45°; 67.5°; 90°; 112.5°; 135°; 157.5°}.

The picture thus produced is called SO1.

During the following step 608, the picture SO1 is oversampled in order to produce the picture predicting the orientations SO0. The samples added are constructed by duplicating the samples of SO1, or by filtering.

In parallel to step 608, during a step 610, the ideal orientations are calculated from the sub-band S0. To do this, an oriented filtering is simulated, according to a technique of the type described in patent document FR-A-2 889 382. This filtering is described in detail above in relation to FIG. 2.

When the filtering of each sample is simulated, the orientation which, amongst all the possible orientations, optimizes a predetermined criterion is determined.

In a particular embodiment, the optimization criterion consists of the minimization of the amplitude of the output sample of the oriented filter. Therefore the orientation is selected that supplies the output whose absolute value is the lowest. As a variant, the criterion can for example consist of the minimization of the coding rate of the output sample of the oriented filter, or the minimization of the coding cost of the output sample, this cost resulting from a linear combination of the rate associated with the coding of the sample and the distortion caused in the picture reconstructed by the coding of this sample.

The set of ideal orientations is called SOI0.

The following step 612 consists of improving the predicted orientations with a view to approximating them as closely as possible to the ideal orientations, with a view to producing the final orientations. In performing this operation, account is taken of the fact that the ideal orientations will not be available to the decoder and that it is therefore appropriate to be able to regenerate the final orientations without knowing the ideal orientations.

In general terms, in accordance with the present invention, the picture SO0 is enhanced so as to approximate it as closely as possible to the picture SOI0.

In a particular embodiment, a prediction by states is used, which is described below. As a variant, it is possible to use a linear predictor with coding of the residues, which is described later.

The sub-step 6120 consists of calculating a prediction by states of the picture of the final orientations. First of all a state function is fixed, which calculates a state for each sample of the picture to be coded. In a particular embodiment, this state is given by the values of a predetermined number of pixels of the sub-band SO0 whose location depends on that of the pixel of the picture. Thus, in the particular embodiment described here, three pixels of SO0 are used, whose locations are defined by SO0($x$−1,y), SO0($x,y$) and SO0($x$, y−1), if the pixel of the picture S0 whose state it is wished to calculate is the pixel situated at the location (x,y). Each pixel of SO0 contains a value from 0 to 7. The state function of the pixel of the original picture situated at the location (x,y) is then equal to SO0($x$−1,y)+8.SO0($x,y$)+64.SO0($x,y$−1). There are 512 possible state values.

The pixels of the picture are then separated into subgroups, each subgroup containing the pixels associated with a state.

Then, for each state, from the pixels associated with this state, the optimal orientation value is calculated. In a particular embodiment, the optimal orientation value associated with a state is calculated by determining the ideal orientation most frequently associated with the pixels associated with this state. In other words, for all the pixels associated with a state, all the values of ideal orientation (that is to say belonging to the picture SOI0) situated at the same place are looked at and the most frequent one is determined.

The decoder needs to know, for each state, the associated orientation value. During the following sub-step 6122, this information is transmitted to the decoder or integrated in the compressed file. This information is for example in the form of the list of orientations in the order of states.

The step 612 then ends by obtaining the picture of the final orientations SOF0, by calculating, for each pixel of the picture S0, the corresponding state, then using the state to know the optimal orientation that is associated with it. This produces the picture of the final orientations SOF0.

A description is now given of a variant embodiment of step 612 of enhancement of the picture of the orientations SO0, which consists of the sub-steps 6220 and 6222.

During the sub-step 6220, the picture of the differences between SO0 and SOI0 is calculated. The picture SD0 is obtained.

In this variant, during the following sub-step 6222, the picture SD0 is coded by DPCM coding (Differential Pulse Code Modulation), that is to say by linear prediction. The signal produced, which contains the prediction error between SO0 and SOI0, is compressed and transmitted to the decoder.

As shown by FIG. 6, step 614, which follows step 612 of obtaining the final orientations, consists of filtering the original sub-band by oriented filtering using a technique of the type described in patent document FR-A-2 889 382.

FIG. 2 shows such a filtering. The principle thereof is stated above and is therefore not repeated here.

Next the orientation of the filter is determined. This orientation is supplied by the picture of the final orientations SOF0. As described above, FIG. 2 shows schematically, on the one hand, the current filter to be applied to the digital picture and, on the other hand, the application of this filter to the current sample.

In a particular embodiment, there are eight possible orientations corresponding to angles uniformly distributed between −90° and 90°. One of these eight orientations will serve to actually filter the signal.

The orientation used on each sample of S0 is given by the prediction picture of the samples SOF0. By filtering the sample of S0 situated at the coordinates (x,y), use will be made of the predetermined orientation, among the eight possible predetermined orientations of the particular embodiment mentioned above, that is closest to SO0($x,y$).

In practice, during the filtering of a digital picture that is a signal of dimension 2, this filtering is iterated three times in order to generate the three sub-bands SH1 said to be of high frequency corresponding to:

a high-frequency filtering on the horizontal axis and a low-frequency filtering on the vertical axis, a low-frequency filtering on the horizontal axis and a high-frequency filtering on the vertical axis, a high-frequency filtering on the horizontal axis and a high-frequency filtering on the vertical axis.

The sub-band corresponding to a low-frequency filtering on each dimension is the sub-band SBE1.

In the case of the filtering of the original sub-band S0, three new high-frequency sub-bands are therefore produced, as in the conventional wavelet transform.

As shown by FIG. 6, step 616, which follows step 614 of obtaining the three high-frequency sub-bands of lower resolution, consists of coding these three sub-bands. This coding is performed in a conventional fashion, for example by scalar quantization or vector quantization and then application of an entropy coding such as Huffman coding or arithmetic coding.

It is also possible to code not only the three high-frequency sub-bands but also the low-frequency sub-band SBE1, in particular in the case where it is not decomposed into sub-bands of lower resolution.

Figure 7:
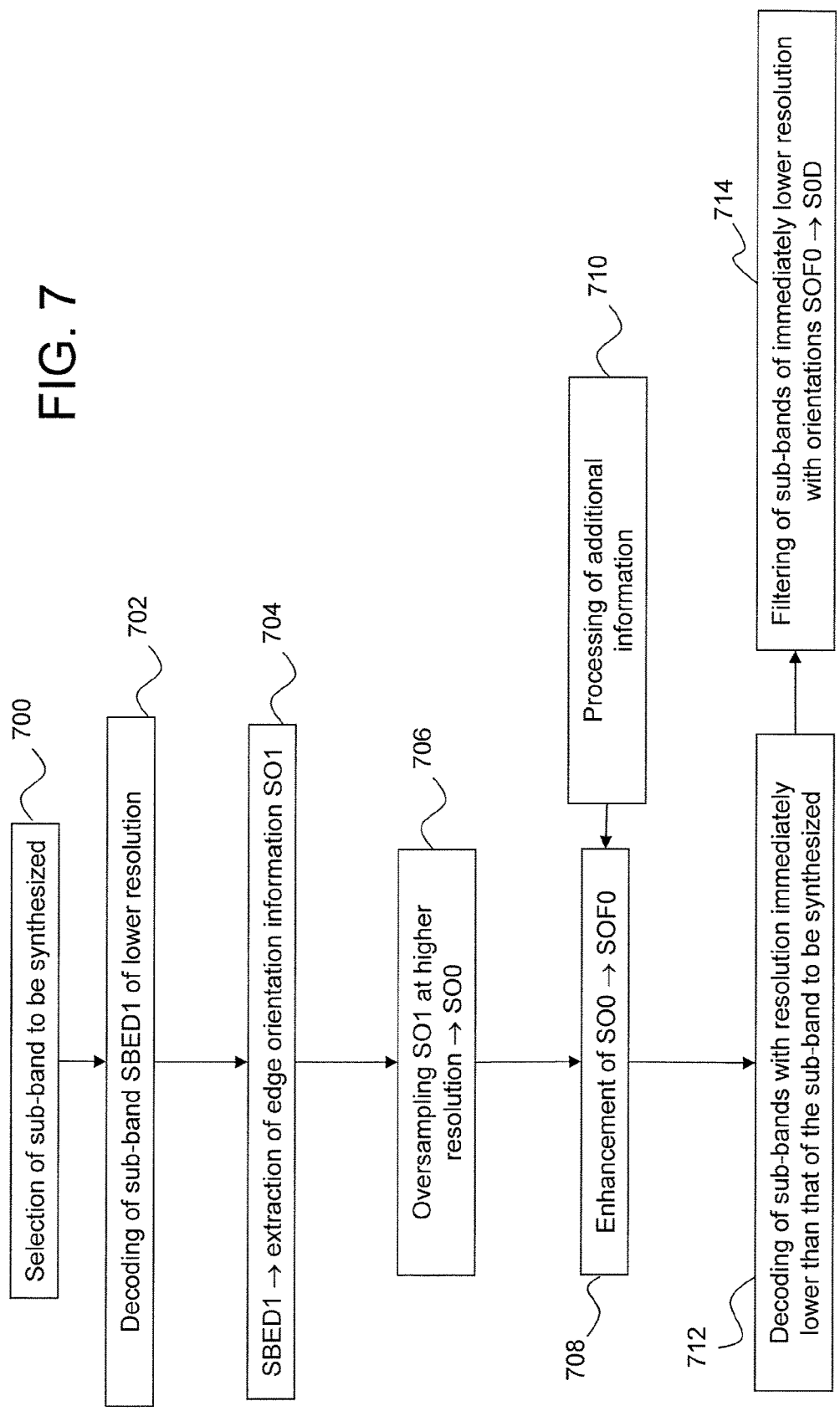
FIG. 7 is a flow diagram illustrating the main steps of a decoding method according to the second aspect of the present invention, in a particular embodiment.

The algorithm for decoding a low-frequency sub-band S0D, that is to say the decoded version of the sub-band S0 of the coding, is described below with reference to FIG. 7.

This low-frequency sub-band can be either the picture to be decoded or a low-frequency sub-band which will subsequently be combined with high-frequency sub-bands in order to generate a low-frequency sub-band of higher resolution.

During a step 700, the sub-band to be synthesized is first selected and then, during a step 702, the low-frequency sub-band of resolution immediately lower than that of S0 is decoded. This is SBED1, this name being identical to that used during coding, since it is exactly the same sub-band.

Then the following two steps 704 of extracting the orientation information for the edges and 706 of oversampling are strictly similar to those applied to the coding.

During the following step 708, an enhancement of the predicted orientations SO0 is performed so as to obtain the final orientations SOF0. This operation is similar to that used at coding. However, because the ideal orientations SOI0 are not available this time, the calculation mode is different, as described below, first of all in an embodiment using a prediction by state and then in a variant using a linear prediction of the difference picture. This calculation is shown in FIG. 7 by the block 710 for processing the additional information.

In the case of a prediction by states, the state function is similar to that used during coding. It should be noted however that the state function uses here only data available to the decoder.

With regard to the decoding of the states, the decoder needs to know, for each state, the associated orientation value. This information was transmitted by the coder, or was integrated in the compressed file, as described above. It has been seen that this information consists for example of the list of orientations in the order of states. This list is read and the decoder now knows the orientation associated with each state.

Finally, the picture of the final orientations SOF0 is obtained by calculating, for each pixel of the picture S0 to be decoded, the corresponding state, and then using the state to know the optimal orientation that is associated with it. This produces the picture of the final orientations SOF0.

If the variant with linear prediction of the difference picture is used on coding, the picture SD0 (the difference between SO0 and SOI0) is decoded by DPCM decoding and then the picture SD0 is added to the picture SO0 obtained previously. Data representing the picture SD0 were transmitted by the coder or integrated in the compressed file.

This constructs the picture of the final orientations SOF0.

The steps 708 and 710 described above are followed by a step 712 consisting of decoding the three high-frequency sub-bands SH1 having the same resolution as SBED1. The decoding of each of these sub-bands is effected by conventional methods such as Huffman entropy or arithmetic decoding and scalar or vector dequantization.

Then during step 714, a reverse filtering similar to the reverse filtering described in patent document FR-A-2 889 382 is carried out. It is a case of applying a filter with a certain orientation to the combined pictures SBED1 and SH1. The orientations are supplied by steps similar to those used during coding and described above.

This filtering results in producing the sub-band S0D, which is the decoded picture.

Figure 3:
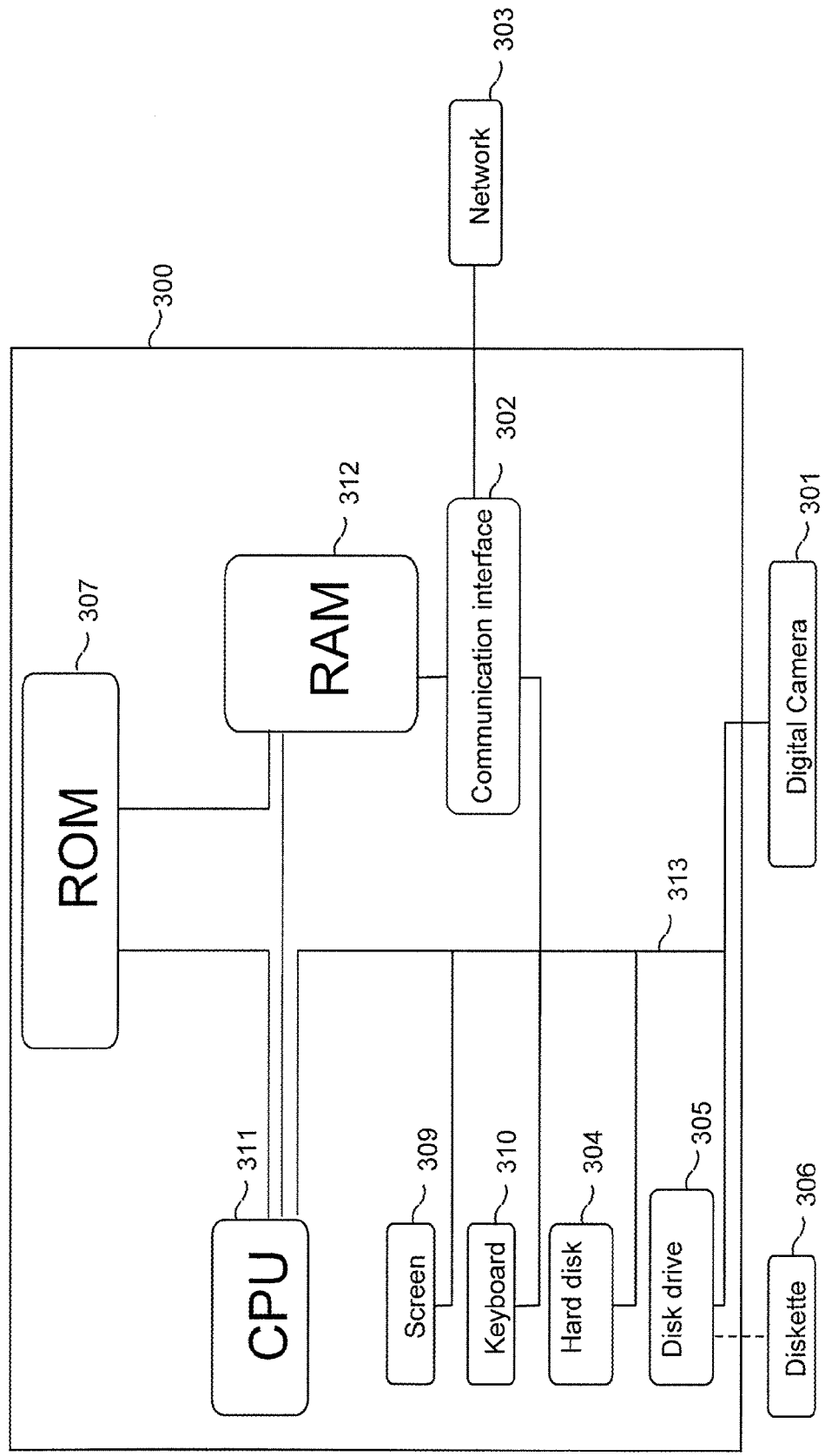
FIG. 3 depicts schematically a particular embodiment of an apparatus able to implement the present invention.

FIG. 3 shows a particular embodiment of an information processing device able to function as a device for coding a multidimensional digital signal and/or as a device for decoding a multidimensional digital signal coded in accordance with the present invention.

The device illustrated in FIG. 3 can comprise all or some of the means of implementing a method of coding a multidimensional digital signal and/or a method of decoding a multidimensional digital signal coded in accordance with the present invention.

According to the embodiment chosen, this device can for example be a microcomputer or a workstation 300 connected to various peripherals, for example a digital camera 301 (or a scanner, or any other picture acquisition or storage means) connected to a graphics card (not shown) and thus supplying information to be processed according to the invention.

The microcomputer 300 preferably comprises a communication interface 302 connected to a network 303 able to transmit digital information. The microcomputer 300 also comprises a permanent storage means 304, such as a hard disk, and a reader of temporary storage means such as a disk drive 305 for cooperating with a diskette 306.

The diskette 306 and the hard disk 304 can contain software implementation data of the invention as well as the code of the computer program or programs whose execution by the microcomputer 300 implements the present invention, this code being for example stored on the hard disk 304 once it has been read by the microcomputer 300.

As a variant, the program or programs enabling the device 300 to implement the invention are stored in a read-only memory (for example of the ROM type) 307.

According to another variant, this program or programs are received totally or partially through the communication network 303 in order to be stored as indicated.

The microcomputer 300 also comprises a screen 309 for displaying the information to be processed and/or serving as an interface with the user, so that the user can for example parameterize certain processing modes by means of the keyboard 310 or any other appropriate pointing and/or entry means such as a mouse, optical pen, etc.

A calculation unit or central processing unit (CPU) 311 executes the instructions relating to the implementation of the invention, these instructions being stored in the read-only memory ROM 307 or in the other storage elements described.

When the device 300 is powered up, the programs and processing methods stored in one of the non-volatile memories, for example the ROM 307, are transferred into a random access memory (for example of the RAM type) 312, which then contains the executable code of the invention as well as the variables necessary for implementing the invention.

As a variant, the digital signal processing methods can be stored in various storage locations. In general terms, an information storage means readable by a computer or a microprocessor, integrated or not into the device, possibly removable, can store one or more programs whose execution implements the coding and/or decoding methods described previously.

It is possible to change the particular embodiment chosen for the invention, for example by adding updated or improved processing methods; in such a case, these new methods can be transmitted to the device 300 by the communication network 303, or loaded into the device 300 by means of one or more diskettes 306. Naturally the diskettes 306 can be replaced by any information medium deemed appropriate (CD-ROM, memory card, etc.).

A communication bus 313 affords communication between the various elements of the microcomputer 300 and the elements connected to it. It should be noted that the representation of the bus 313 is not limiting. This is because the central unit CPU 311 is, for example, able to communicate instructions to any element of the microcomputer 300, directly or by means of another element of the microcomputer 300.

Figure 8:
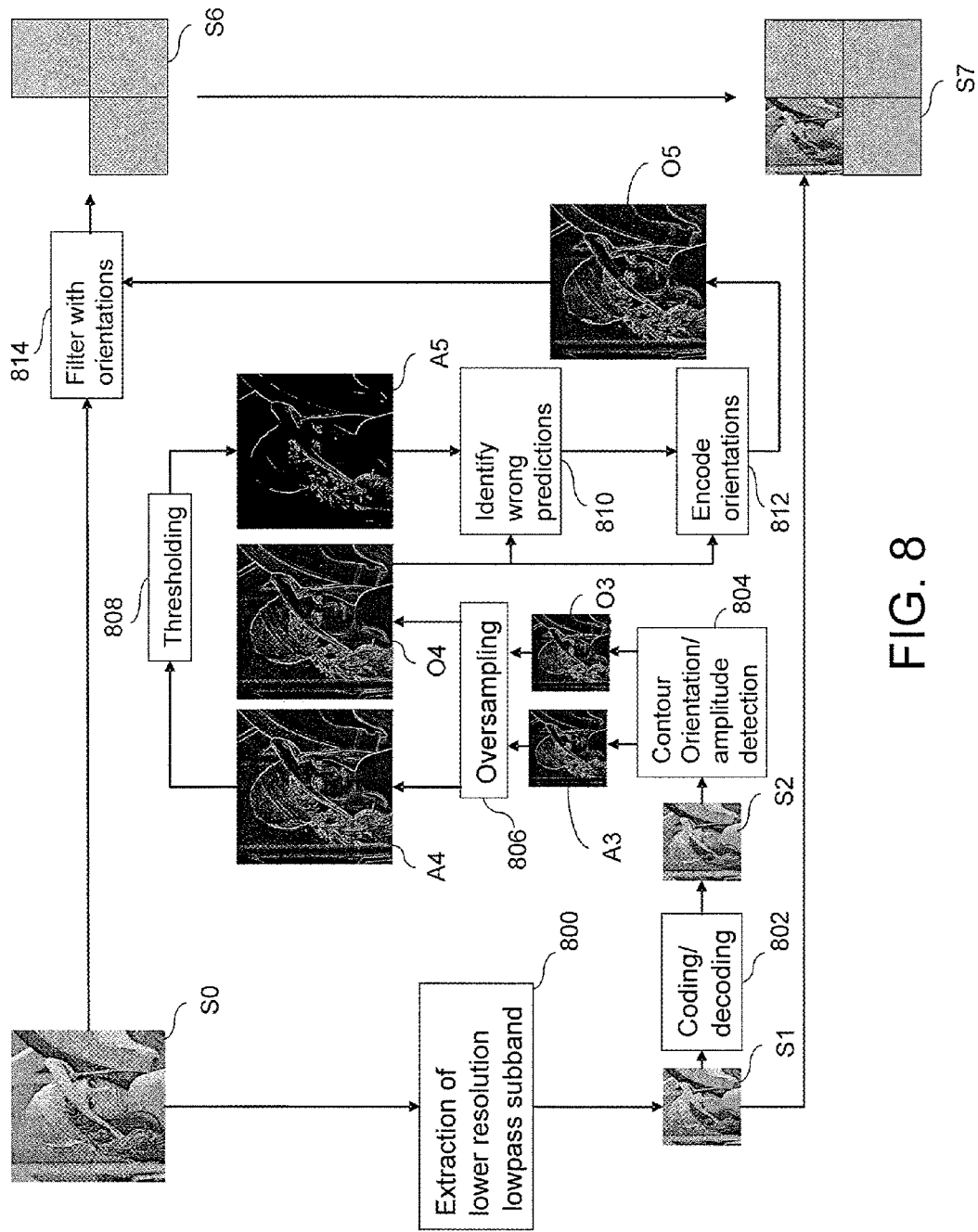
FIG. 8 shows the overall structure of the orientation construction in accordance with the present invention.

FIG. 8 shows the structure of the orientation construction.

First (step 800), the image S0 to be transformed is decomposed to obtain the low-pass sub-band of the immediate lower resolution. Since the low-pass filter usually achieves this by interacting with the high-pass sub-bands, and these high-pass sub-bands do not exist yet since they require oriented filtering, a simple sub-sampling is used (in other words, the low-pass filter has a length of one). This produces image S1, which has half the resolution of S0 in each dimension.

Second (step 802), one wants to build the decoded version of the low-pass sub-band just generated, in order to use information that is available at the decoding side to perform the prediction of orientation. So, the S1 sub-band is encoded and then decoded, this involving a recursive process where the sub-band is divided again, encoded-decoded, etc. This produces sub-band S2.

Third (step 804), assuming S2 is available, the decoded version of the current low-pass sub-band, a Sobel filter is applied. Sobel filters are able to extract both the location and orientation of the edges in an image. The edge amplitude image produced is called A3, and the edge orientation image is called O3.

Then (step 806) both O3 and A3 images are oversampled by a factor of 2 in each dimension to match the size of the original sub-band S0. O4 and A4 are the respective oversampled images. The O4 image is later called the predicted orientations image.

During the next stage (step 808), the edge amplitude image A4 is thresholded in order to generate a mask, called A5. This mask indicates which part of the S0 image corresponds to edges and which part correspond to uniform areas. It is to be noted that, of course, ideally, one would perform the edge analysis directly on S0. However, S0 is not available during decoding. This is why we have to go through the whole process of extracting the information from the S2 sub-band, which is the only information available at the decoder side.

The A5 mask image will be used to determine the orientation differently, depending on whether the samples to be processed are located in an edge area or not. Outside an edge area, the orientation of the filter is less important, so it is unnecessary to use bits to encode it. Therefore, outside the edge areas, the orientations are predetermined. For example, the predicted orientations given by O4 image can be used. It is also possible to use a predetermined orientation that corresponds to the regular wavelet transform.

Inside the edge areas, the predicted orientations provided by O4 are also used. However, during encoding, it is checked whether the prediction reduces the amplitude of the output of the filter sufficiently (this is possible during encoding, because the ideal orientation is available). If the prediction is good enough, it is used, otherwise, the encoded ideal orientation is transmitted. Consequently, some information is sent to the decoder for each original sub-band pixel located inside an edge area. This information is either a symbol indicating that the prediction orientation should be used, or the ideal orientation encoded. The process described above is handled by steps 810 and 812, described in the two following paragraphs.

The goal of step 810 is to identify the predicted orientations that are wrong. "Wrong" means orientations that generate much more amplitude as compared to the ideal orientation. Therefore, during this stage, for each pixel that is located inside an edge area, one compares the output of the filtering when the predicted orientation is used (the one provided by the O4 image) and the output of the filter when the ideal orientation is used (the ideal orientation is simply the one that minimises the output of the filter). If the ratio between these two values is below a certain threshold, then the prediction is good enough. Otherwise, the prediction is not good. The threshold default value is for example 3. This means that if the amplitude predicted by O4 is less than three times the amplitude of the ideal orientation, then the prediction is used. Otherwise, the ideal orientation is used and encoded. As mentioned above, this is only performed for the pixels lying inside the edge areas. Although the above value of the threshold has been determined experimentally to be efficient, other values are of course possible.

During step 812, the orientations that belong to edges are encoded. This is performed by transmitting a predefined symbol when the prediction has been determined as good enough during the previous stage, and by transmitting an encoded symbol corresponding to the ideal orientation otherwise. During this stage, one also builds the orientations to be used for the frequency decomposition: outside the edge areas defined by image A5, these are the predicted orientations (the ones contained in image O4). Inside the edge areas, the orientations are either the predicted orientation or the ideal orientation.

Step 812 results in an image O5, which is then filtered according to the orientations previously determined (step 814).

In FIG. 8, S6 shows the high-frequency sub-bands produced by filtering with the oriented filters and S7 shows the result of the filtering of S0 using the proposed method, i.e. gathering the high-frequency sub-bands produced and the low-frequency sub-band S1.

The invention claimed is:

1. A method of coding a multidimensional digital picture signal by decomposition into frequency sub-bands, wherein said decomposition into frequency sub-bands uses a filtering according to a plurality of geometric orientations, said method comprising steps of, for a plurality of samples of said picture signal:
generating a first orientation prediction according to a predetermined technique;
determining an ideal filtering orientation by simulating the filtering of said picture signal as a function of a predetermined optimization criterion;
modifying said first orientation prediction using said ideal orientation, so as to obtain a final orientation; and
filtering said picture signal using, during said filtering according to a plurality of orientations, said final orientation.

2. A coding method according to claim 1, wherein, during said modification step, the linear prediction of the difference between said first prediction and said ideal orientation is used.

3. A coding method according to claim 1, wherein, during said modification step, a state calculation is used and there is attributed to each sample in said plurality of samples an orientation as a function of the state of said sample.

4. A coding method according to claim 1, wherein, during said step of generating a first orientation prediction, the edges of the decoded low-frequency sub-band with a resolution lower than the resolution of a selected current sub-band are analyzed.

5. A coding method according to claim 1, wherein said optimization criterion includes the minimization of the amplitude of the output samples of the filtering.

6. A coding method according to claim 1, wherein said optimization criterion includes the minimization of the coding rate of the output samples of the filtering.

7. A coding method according to claim 1, wherein said optimization criterion includes the minimization of the coding cost of the output samples of the filtering, the coding cost of a sample resulting from a linear combination of the rate associated with the coding of said sample and the distortion caused by the coding of said sample.

8. A coding method according to claim 1, wherein the coding method is performed by an information storage means readable by a computer or a microprocessor storing instructions of a computer program, allowing the implementation of the coding method.

9. A coding method according to claim 1, wherein the coding method is performed by a computer program product loadable into a programmable apparatus, containing sequences of instructions for implementing the coding method, when the program is loaded into and run by the programmable apparatus.

10. A device for coding a multidimensional digital picture signal by decomposition into frequency sub-bands, wherein said decomposition into frequency sub-bands uses a filtering according to a plurality of geometric orientations, wherein for a plurality of samples of said picture signal, said device comprises:
- means for generating a first orientation prediction according to a predetermined technique;
- means for determining an ideal filtering orientation by simulating the filtering of said picture signal as a function of a predetermined optimization criterion;
- means for modifying said first orientation prediction using said ideal orientation, so as to obtain a final orientation; and
- means for filtering said picture signal using, during said filtering according to a plurality of orientations, said final orientation.

11. A device for coding a multidimensional digital picture signal by decomposition into frequency sub-bands, wherein said decomposition into frequency sub-bands uses a filtering according to a plurality of geometric orientations, said device comprising:
- a computer-readable memory constructed to store computer-executable instructions implementing process steps; and
- at least one processor constructed to execute the computer-executable instructions stored in the memory,
- wherein the process steps implemented by the instructions stored in the memory comprise, for a plurality of samples of said picture signal:
- generating a first orientation prediction according to a predetermined technique;
- determining an ideal filtering orientation by simulating the filtering of said picture signal as a function of a predetermined optimization criterion;
- modifying said first orientation prediction using said ideal orientation, so as to obtain a final orientation; and
- filtering said picture signal using, during said filtering according to a plurality of orientations, said final orientation.

* * * * *